May 16, 1933.        A. HALL        1,909,400
BRAKE LOCK
Original Filed Dec. 24, 1930.   3 Sheets-Sheet 1

INVENTOR.
ALBERT HALL
BY  A. D. Caesar
ATTORNEY.

May 16, 1933. A. HALL 1,909,400
BRAKE LOCK
Original Filed Dec. 24, 1930 3 Sheets-Sheet 2

INVENTOR.
ALBERT HALL
BY
*a.D.Caesar*
ATTORNEY.

May 16, 1933. A. HALL 1,909,400
BRAKE LOCK
Original Filed Dec. 24, 1930   3 Sheets-Sheet 3
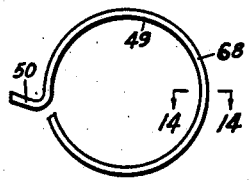
FIG. 22
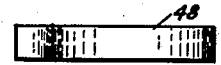
FIG. 23   FIG. 14
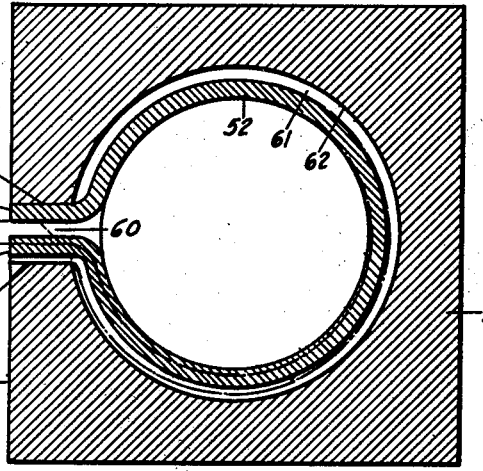
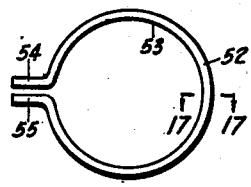
FIG. 15
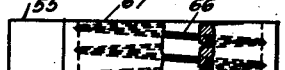
FIG. 24   FIG. 20
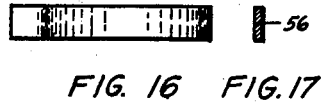
FIG. 16   FIG. 17
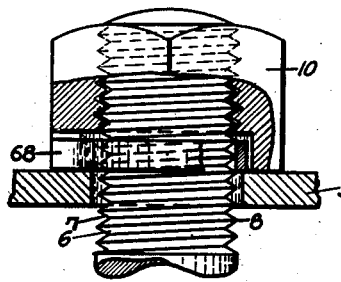
FIG. 18
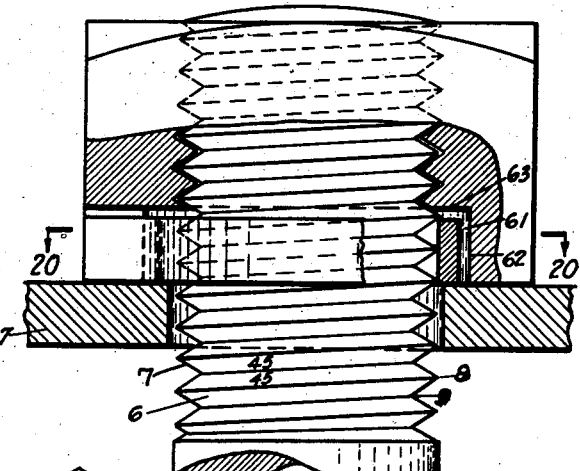
FIG. 21
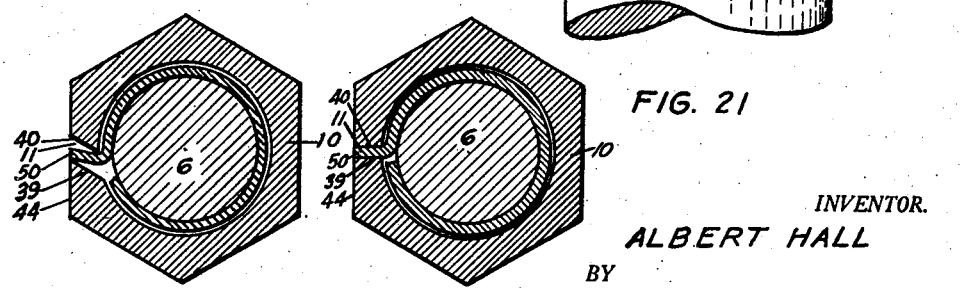
FIG. 19   FIG. 25
INVENTOR.
ALBERT HALL
BY
*A.D.Caesar*
ATTORNEY.

Patented May 16, 1933

1,909,400

UNITED STATES PATENT OFFICE

ALBERT HALL, OF ARDMORE, PENNSYLVANIA, ASSIGNOR TO SAFETY NUT CORPORATION, OF PHILADELPHIA, PENNSYLVANIA, A CORPORATION OF PENNSYLVANIA

BRAKE LOCK

Application filed December 24, 1930, Serial No. 504,446. Renewed October 8, 1932.

This invention relates to locking mechanisms for elements which are threadably joined together and has for its object the production of a new and improved lock for this purpose.

More particularly stated, one of the objects of this invention is the production of a new and improved brake lock for nuts.

Another object of this invention is the production of a brake lock which may be unlocked by means of a simple wedge.

Another object of this invention is to produce a combined brake lock and nut wherein the brake lock element is not permanently connected with the nut.

Another object of this invention is to produce a combined lock and nut which will tighten when subjected to forces producing vibration.

Another object of this invention is to produce a brake lock having a minimum number of elements and comparative simplicity of construction.

The above as well as other objects of this invention and the advantages arising therefrom will become more apparent from the following description and the drawings which form a part thereof.

In the drawings Figure 1 is a perspective view of my new helical locking band.

Figure 14 is a section on the line 14—14 of Figure 22.

Figure 15 is a top view of the type of band shown in Figure 22 when provided with both a locking and an unlocking lug.

Figure 16 is a front view of the disclosure shown in Figure 15.

Figure 17 is a section taken along the line 17—17 of Figure 15.

Figure 18 is a front view partially in section of an assembly of a nut, bolt and the locking band shown in Figure 22 mounted in operative position. A portion of the nut and band has been torn away for the purpose of clearness.

Figure 19 is a horizontal section taken through the assembly of the nut, bolt, and band shown in Figure 18.

Figure 20 is a section taken along the line 20—20 of Figure 21.

Figure 21 is a front view partially in section of an assembly of a nut, bolt and the locking band shown in Figure 15 mounted in operative position. A portion of the nut and band has been torn away for the purpose of clearness.

Fig. 22 is a top view of a modified locking band having a locking lug formed thereon.

Fig. 23 is a front view of the same.

Figure 1:
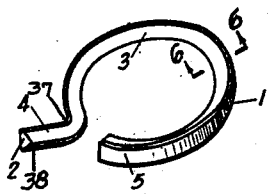

Figure 24 is a front view of still another modification in band structure. The band shown is of the non-helical type generally similar to the band disclosed in Figures 15 and 22 and differs from the band shown in Figures 15, 16 and 17 only in the fact that it has helical grooves formed on its inner surface. The pitch of these grooves is equal to that of the thread of the bolt with which the band is adapted to cooperate. A portion of the front of the band has been broken away for the purpose of clearness.

Figure 25 is a cross section taken similar to Figure 19 wherein the slot is substantially equal to the cross section of the lug which is received therein, thus resulting in a snug fit.

Referring more particularly to the drawings wherein similar reference numerals denote similar parts, reference numeral 1 denotes a helical locking band which is composed of a main body section 3 terminating in a lug 4 as shown.

Figure 6:
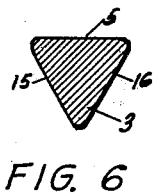
Figure 6 is a section along the line 6—6 of Figure 1.
Figure 7:
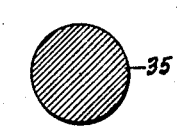
Figure 7 is a similar section taken through a helical locking band, modified as to cross section.

The helical locking band is substantially tri-angular in its cross section with the corners of the triangle rounded off as shown at 2 in Figure 1 and as can clearly be seen by referring to Figure 6. If desired, however, this locking band may be circular in cross section as shown in Figure 7, or of any other cross section desired falling between a triangle and a circle, such as an ellipse.

The nut 10 has a counterbore 17 formed in the face 12 thereof. The counterbore 17 is at right angles to the axis of the nut and has the vertical sides 14 and the horizontal base portion 13. A slot 11 extends outwardly from the side 14 of the counterbore towards a face of the nut 10. The slot 11 may be situated at any point along the wall 14 of the counterbore and is preferably parallel with the face 36 of the nut running in the same general direction as the slot. (See particularly Figures 2, 4 and 5.) In the preferred modification the slot 11 terminates at the face 44 of the nut 10 towards which it extends. (See Figures 2, 3 and 5.) The slot 11 is preferably wider than the cross section width of the helical band 1.

Although the method of assembly and the manner of use of the device herein disclosed is believed to be obvious in the foregoing disclosure, nevertheless, for the purpose of obviating any possible misunderstanding, the following detailed description is here given.

Figure 2:
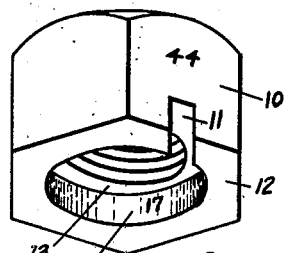
Figure 2 is a perspective view of a bolt having my helical locking band thereon and a nut just before it is applied to the bolt.
Figure 2:
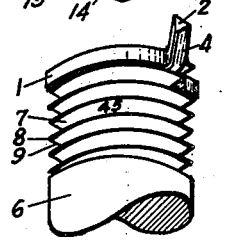

In the preferred method the helical locking band 1 is placed upon a bolt 6 which is threaded at 7, in the same manner that a nut would be screwed thereon. The thread has the usual points of maximum width 8 and minimum width 9 which are the faces 45. Just one turn is taken, as shown in Figure 2. The lug portion of the helical band 1 is uppermost, as is also shown in Figure 2. In this position the general direction of the lug 4 is such that it fits into the slot 11 with the outer end 37 substantially in contact with the face 40 of the slot 11 and the inner end 38 contacting with the face 39 of the slot 11. (See particularly Figure 3.) It is preferable that the lug 4 fit snugly, as shown, making contact with both faces for two reasons—viz—

(a) For the sake of uniformity and standardization since in the modification wherein an unlocking lug is provided the lug 4 must fit snugly or substantially so, as will be hereinafter explained.

(b) By causing the lug to touch both walls of the slot 11 as shown, it becomes necessary to bend the lug at an oblique angle to a tangent drawn to the band at the bend point instead of at a right angle thereto, thus avoiding a possible weakening of material caused by a right angle band.

However, while this structure is preferable it is not absolutely necessary since the lug 4 may lie so as to be free of the walls of the slot 11 when in the inactive position and the brake lock herein disclosed will still function as soon as the nut is moved a sufficient distance to cause the slot wall 40 to contact with the outside surface 5 of the band 1.

The faces 15 and 16 contact with the faces 45 of the threaded portions around which they are mounted, while the outer face 5 is entirely free and does not contact with the wall 14 of the counterbore. (See Figures 3 and 4.)

Figure 3:
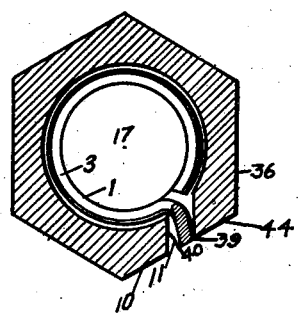
Figure 3 is a horizontal section taken through the nut, bolt and helical locking band when the unit is assembled. The bolt is not shown in section for the purpose of clearness.

An examination of Figure 3 will show that any force applied which will tend to unscrew the nut will cause the wall 40 to press against the end 37 of the helical locking pin 1 and exert a tightening effect upon the bolt 6, thus acting as a brake. On the other hand, rotation of the nut in the direction tending to move the nut on the bolt will cause the face 39 of the slot 11 to press against the end 38 of the helical locking band 1, tending to enlarge the circumference of the helical band, thus making it possible for the nut to advance upon the bolt whenever desired.

It has been proved that vibration of any kind, instead of jarring the nut loose causes the ensemble to become tightened. It is to be noted that this locking band is not permanently connected to either the nut or the bolt. It is further to be noted that only one end of the helical band has a lug which contacts with the slot walls to produce a gripping effect on the bolt whereby the nut is prevented from rotating off the bolt as a result of forces which produce vibration; the other end is free of any gripping or anchored protuberances. By the use of my helical band I not only eliminate the necessity of permanently anchoring one end of the braking member but I further eliminate the use of a locking lug for each end of the braking member. Wherever I use a protuberance or lug in addition to the locking lug it is for unlocking purposes only. The unlocking lug, when used, is entirely free of the slot walls at all times except when it is desired to unlock the helical band, as will hereinafter be more particularly described.

It is further to be noted that unless the helical locking band is properly mounted upon the bolt the lug 4 will not fit into the slot 11. (See Figure 5.) The helical locking band therefore checks itself and improper mounting and use is made impossible.

If it is desired to use a helical locking band which can be unlocked, a helical band of the type shown in Figures 8 to 13 may be used. This helical locking band 18 is generally similar to the helical band 1 and has a helical body portion 19 and a locking lug 21. It differs from the helical band 1 only in the fact that it is provided with an unlocking lug 20. The relative structures of the locking lug 21 and the unlocking lug 20 must be such that the wall 41 of the slot 33 will contact with the face 24 of the locking lug but that the wall 41 of the said slot 33 will not contact with the inner faces 25 and 26, or juncture point 48 of the unlocking lug 20.

This result is best obtained by so forming the lug 21 that at least one point on the outer face 24 contacts with the wall 41 of the slot 33 (as shown at 46 in Figure 10) while at least one point of its inner faces 25—26, or the juncture point 48 of the said faces, contacts with the wall 42 of the said slot 33 (as shown at 47 in said figure), and at the same time forming the unlocking lug 20 so that it is parallel to but entirely free of the walls 41 and 42 of the slot 33 formed in the nut 27. This makes it possible for the locking and braking effect to be exerted as a result of the pressure of the wall 41 against a point on the outer face 24 of the locking lug 21 when the nut 27 is turned in a direction which will tend to move the nut off the bolt. Were the structure of the locking lug 21 such that a point on each face of the locking lug did not simultaneously contact with the walls 41 and 42 of the slot 33, then a condition might arise where, because of the clearance provided in the slot 33, the pressure of the wall 41 against the point on the locking lug 21 would force the lug over until the wall 41 contacted not only with a point on the locking lug 21 but with the faces 25 and 26, or the juncture point 48 of the unlocking lug 20, thus tending to simultaneously exert a locking and braking effect on the lug 21 and an unlocking effect through the lug 20, thus weakening, if not entirely vitiating the locking effect. It is, therefore, obvious that although the lug 21 may be so formed that there is some clearance between its outer and inner walls and walls 41 and 42 of the slot 33, nevertheless, this clearance should be so small that when pressure is exerted upon the nut 27 in a direction tending to move the nut off the bolt, the outer and inner faces, or juncture point 24 and 25—26 or 48, of the locking lug 21 will simultaneously contact with the walls 41 and 42 respectively of the slot 33 before any face of the unlocking lug 20 can contact with the wall 41 of the said slot 33, thus obviating the presence of any unlocking force when only a locking or braking force is desired.

It is further obvious that the slot 33 may be made wider and the relative position and structure of the unlocking and locking lugs be such that wall 41 of slot 33 contacts with the face 24 of the locking lug 21 to produce the braking pressure desired but does not contact with the unlocking lug 20.

Figure 12:
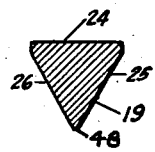
Figure 12 is a section taken along the line 12—12 of Figure 8.
Figure 13:
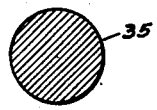
Figure 13 is a similar section of a helical locking band modified as to cross section.

The helical band may be triangular in shape, as shown by the ends 22 and 23 of the lugs 20 and 21 and in Figure 12, or may be circular in cross-section, as shown in Figure 13, or of any cross-section, such as elliptical, between a circle and a triangle.

The helical band 18 is illustrated in use in conjunction with a square nut 27 having a counterbore 28 formed in the face 29 thereof. The counterbore has the side walls 30 and the horizontal base portion 31. A slot 33 runs from the counterbore 28 to the face 32 of the nut 27. The slot 33 is parallel to the side of the nut 43 in the general direction in which it runs. Since it is desired to make both the lugs 20 and 21 of the same cross-section for practical reasons, the slot 33 is made of greater width than the maximum cross-sectional width of the lugs 20 and 21. This is done for the purpose of insuring the necessary clearance for the lug 20 and making possible the relative structures of the lugs 20 and 21 and their proper alignment (shown particularly in Figure 10) within the slot 33.

From the above description it is seen that with the exception of the fact that the nut in Figures 8 to 13 is square while that shown in Figures 1 to 7 is hexagonal, both are exactly of similar construction as far as they relate to the features essential for the practice of this invention.

In use the helical locking band is mounted upon the bolt 6 in a manner similar to that followed in connection with the locking band 1. The nut 27 is then mounted upon the assembly of the bolt and helical band. In the active position (shown in Figure 10) both the inner and outer surfaces of the locking lug 21 contacts with the walls 41 and 42 of the slot 33 in the manner hereinabove described. This is exactly similar to the action of the locking lug 4 with the walls 40 and 39 of the slot 11. (Compare Figures 10 and 3.) The faces 25 and 26 of the body portion 19 contact with the faces 45 of the threads 7 of the bolt 6. The unlocking lug 20 is parallel to the walls 41 and 42 but entirely free of them. The face 24 of the band 18 is entirely free of and does not contact with the walls 30 of the counterbore 28.

It is obvious that rotation of the nut in the direction tending to advance it upon the bolt will result in a contact of faces 25—26, or the juncture point 48 of the said faces, of the lug 21 with the wall 42 of the slot 33. This tends to open the helix. The nut therefore advances upon the bolt. Any force tending to produce rotation of the nut in the direction tending to remove the nut from the bolt will result in contact of the wall 41 with the face 24 of the lug 21, thus closing the helix. The walls 25 and 26 now grip the thread surfaces with which they contact, thus opposing the motion of the nut in that direction. These reactions are exactly similar to the reactions of the lug 4 under similar conditions.

If it is desired to unlock the nut a wedge 34 such as a screw driver end is placed between the wall 41 and the inner faces 25—26, or the juncture point 48 of the said faces, of the unlocking lug 20, thus forcing the lug 20 to contact with the wall 42. The helix is opened and the body portion assumes the position shown by the dot and dash lines in Figure 10. The nut may now be freely rotated and removed from the bolt.

Figure 8:
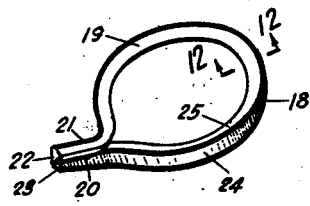
Figure 8 is a perspective view of my helical locking band when provided with an unlocking element.

Instead of using helical locking bands of the type shown in Figures 1 and 8 locking bands of the type shown in Figures 22 and 15 may be used. The bands differ from those shown in Figures 1 and 8 in the fact that the helix is eliminated.

The band 68 shown in Figure 22 is composed of a body portion 49 terminating at one end in a lug 50. The band is rectangular in cross-section as shown at 51 in Figure 14.

The nut 10 to be used in combination with the band 68 is exactly similar to the nut 10 described hereinabove for use in association with the helical band 1.

In use a bolt 6 is placed through the aperture in the member 57 to be bolted. The locking band 68 is placed over the bolt 6 with the lug 50 in the proper position for cooperation with the slot 11 of the nut 10. (If the band 68 is so placed that the lug 50 is on the wrong side it will not fit into the slot 11 for the reasons more particularly hereinabove set forth in connection with the description of Figure 5.) The nut 10 is now placed over the assembly of the bolt 6 and locking band 68. The body portion 49 and the locking lug 50 are received in the counterbore 17 and the slot 11 respectively of the nut 10, as shown in Figures 18 and 19, with the outer surface of the body portion 49 free of the walls 14 of the nut 10.

Figure 4:
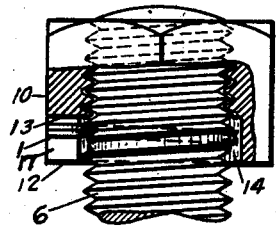
Figure 4 is a front view of the assembly of the nut, bolt and helical locking band. Part of the nut is broken away for the purpose of more clearly illustrating the invention.
Figure 5:
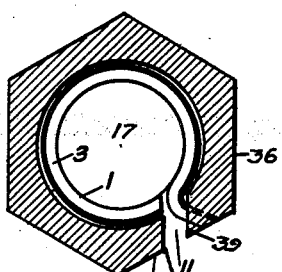
Figure 5 is a plan view partially in section showing the result obtained when the helical locking band is improperly mounted on the bolt and illustrating the self checking feature of my invention.

A comparison of Figures 18 and 19 with Figures 3 and 4 discloses that the only difference btween the helical band 1 and the band 68 is that the faces 15 and 16 of the helical band 1 contact with the surfaces 45 of the threads 7 while the inner face of the band 68 contacts only with the outer peripheries of the thread 7.

Rotation of the nut 10 in the direction tending to move the nut off the bolt will result in pressure of the slot wall 40 upon at least one point on the outer surface of the lug 50 (which is exactly similar to the reaction of the elements shown in Figures 3 and 4) with the result that the inner surface of the body member 49 of the locking band 68 will exert pressure upon the outer peripheries 8 of the threads 7. Since frictional force is directly proportional to the pressure and the coefficient of friction, all other things being equal, the frictional force exerted is the same for the assembly of a nut, bolt, and locking band whether the band is of the helical or non-helical type.

If a non-helical band is provided with an unlocking lug as well as a locking lug a band 52, shown in Figure 15, results. The band 52 has the body portion 53 which terminates in a locking lug 54 and an unlocking lug 55.

The nut used in combination with the band 52 may be exactly similar to the nuts 10 or 27. If desired however the modification shown in Figures 20 and 21 may be used. This differs from the disclosure in the nut 27 only in the fact that the slot 60 is centrally placed and that it is made wider than the slot 10 or 33. The counterbore 61 and its walls 62 and 63 are exactly similar to the equivalent elements 14 and 13 respectively of the counterbore 17 of the nut 10.

In use the bolt 6 is placed through the aperture in the element 57 to be bolted. The band 52 is placed over the bolt 6 so that the lugs 54 and 55 will be in the proper position for cooperation with the slot 60. The nut 58 is then placed over the assembly of the bolt 6 and band 52. The body portion 53 of the band 52 is received in the counterbore 61 of the nut 58, with the outer surface of the body portion 53 entirely free of the walls 62 of the counterbore 61, and the lugs 54 and 55 are received in the slot 60.

Figure 10:
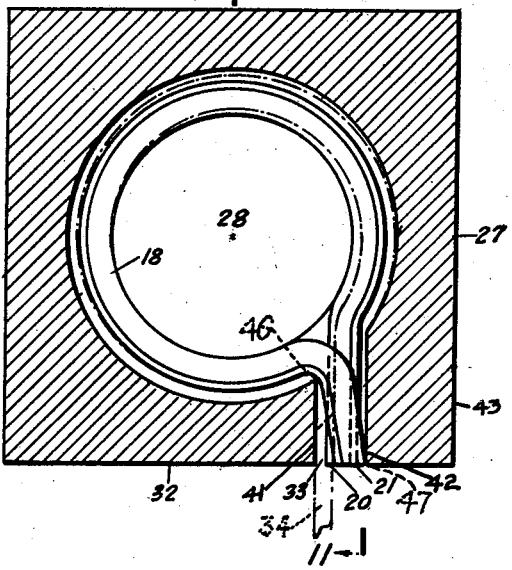
Figure 10 is a horizontal section taken through the assembled unit of the bolt, nut and helical band. The unlocking wedge and the position assumed by the helical locking band when the unlocking wedge is applied is shown by dot and dash lines.
Figure 11:
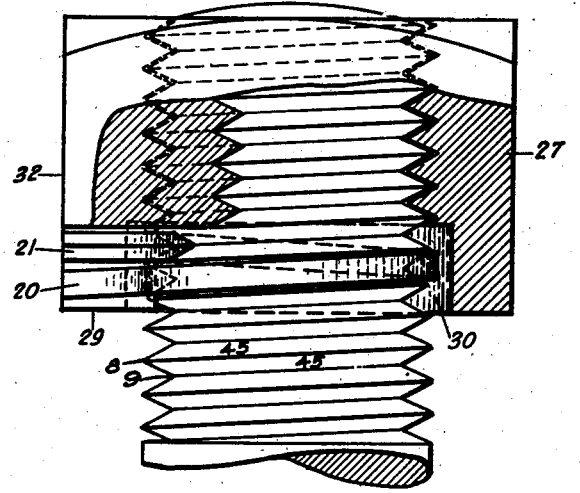
Figure 11 is a partial section taken along the lines 11—11 of Figure 10.

A comparison of the disclosure in Figures 20 and 21 with that of Figures 10 and 11 discloses only the following two differences between the relative arrangement of the operating parts:

First: The inner surface of the body portion 53 of the band 52 contacts with the outer peripheries 8 of the thread 7 on the bolt 6 instead of with the thread surfaces 45.

Secondly: Since the band is not helical the locking and unlocking lugs are in the same plane.

Neither difference in structure has any effect on the basic principles of operation of the unit. As has been hereinabove described in connection with Figures 18 and 19 the fact that the band grips the peripheries of the thread instead of the thread surfaces does not change the frictional force exerted on the bolt 6 to prevent rotation of the nut in a direction tending to move the nut off the bolt. The fact that the locking and unlocking lugs 54 and 55 are in the same plane makes it only necessary to so arrange them relatively to each other and the slot 60 of the nut 58 (or the slot of any other type of nut used) that the outer face of the locking lug 54 contacts with the wall 64 of the slot 60 when the nut is rotated in a direction tending to move the nut off the bolt while the unlocking lug 55 does not contact with either the inner face of the lug 54 or the wall 65 of the slot 60. (See Figures 20). To accomplish this result the slot 60 (or the slot of any other nut used) is made of sufficient width to allow for the clearance required between the lug 55 and the lug 54 and the wall 65 respectively.

An examination of Figures 20 and 21 discloses that turning the nut 58 in a direction tending to move the nut off the bolt will result in pressure being exerted by the slot wall 64 upon the outer face of the locking lug 54 with the result that the inner surface of the body member 53 of the band 52 exerts pressure upon the peripheries 8 of the threads 7, which in turn produces a force opposing the rotation of nut. If it is desired to unlock the band for enabling the nut to be freely moved off the bolt it is only necessary to insert a wedge element 34 between the lugs 54 and 55. The lug 55 and the body member 53 of the band 48 will then assume the positions shown by the dot and dash lines in Figure 20, making it possible to freely rotate the nut with respect to the bolt.

It is obvious from the above description that the non-helical locking bands 68 and 52 function on the same principles as the helical bands 1 and 18. The only difference is that the non-helical bands grip the thread peripheries 8 while the helical bands grip the thread surfaces 45. They are both generally similar in shape being split-annular rings one end of which terminates in a locking lug while the other end may or may not terminate in an unlocking lug.

*Definition.*—For this reason the term "split annular band" when used in the specification and claims is used to denote broadly a split band either of the helical or non-helical type disclosed in the drawings and specification.

Figure 4A:
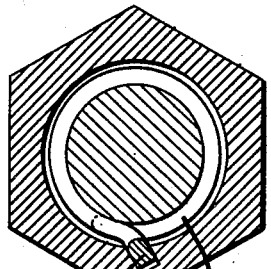
Figure 4a is a view taken similarly to Figure 3 showing a modification of the slot and lug structure.
Figure 4B:
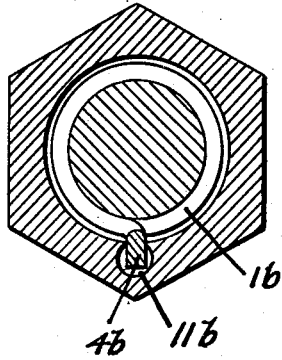
Figure 4b is a view taken similarly to Figure 3 showing another modification of the slot and lug structure.
Figure 9:
Figure 9 is a perspective view of a bolt having the helical locking band shown in Figure 8 mounted thereon with a nut about to be applied to the bolt.

The above disclosure is by the way of illustration only and not by the way of limitation since many changes may be made without departing from the spirit of my invention: For instance, the type of nut to which the invention is applied may be changed. It may be hexagon, as shown in Figures 2 to 4, or square, as shown in Figures 9 to 11, or any other shape desired: Or the cross-section of the pin may be varied as hereinabove illustrated: Or the nut may be replaced by a stationary member and the bolt or screw rotated, as, for instance, in a set-screw structure: Or it may be used in any construction where two elements are threadably joined together by providing the one which serves as the equivalent of a nut with the necessary counterbore and slot and using my helical or plain locking band in conjunction therewith: Or the dimensions of the locking lug and its cooperating slot may be varied: Or the manner of assembly of the nut, bolt and band may be varied by placing the band within the nut groove and mounting the unit upon the bolt: Or instead of running the slots, such as 11, to the face 44 of the nut 10, the same may be terminated somewhat short of the face and the length of the lug 4 modified accordingly: Such a structure is shown in Figures 4a and 4b. The locking band 1a of Figure 4a differs from the locking band 1 of Figures 1 to 5 inclusive only in the fact that its lug is smaller in order to be properly received in the slot 11a. The slot 11a differs from the slot shown in Figure 25 in that it terminates short of the face of the nut and that it is on an agle to the face of the type shown in Figure 19. The coil 11b shown in 4b differs from the coil 1 shown in Figure 1 in that its lug 4b has been shortened in order that it may be received in the slot 11b and further in that its lug 4b makes a right angle bend with the coil similar to the coils shown in Figures 19 and 25. The slot 11b shown in Figure 4b differs from the slot shown in Figure 25 in that it terminates short of the face of the nut and that it has been made by drilling resulting in the shape shown. It is to be noted that the lug 4a is snugly received in the slot 11b similar to the lug slot structure of Figure 25 and that the sides of the lug 4b touch the walls of the slot 11b at the point of entrance of the lug 4b into the slot 11b: Or it may be possible to use nut slots of equal width for helical and nonhelical hands for with the structure disclosed in Figures 22 and 15 a band of narrow cross-section can be used. The width of the cross-section is wholly dependent on the strength of material used, it being necessary that the lug 54 should not be bent or sheared when the nut is subjected to forces producing vibration and tending to move the nut off the bolt. Or instead of making the non-helical bands with a smooth inner face as shown in Figures 22 and 15 the said inner or gripping face may be knurled or serrated. It is obvious that a material may be found which while thin enough in cross-section to permit the use of a nut slot of equal width for helical and non-helical bands yet will still be strong enough to give the service desired: Or instead of making the inner surfaces of the band 48 and 52 smooth and straight they could be scored with a thread having the pitch of the thread of the nut and bolt with which the said bands are intended to cooperate. This modification is shown in Figure 24. Or certain nuts may be designed only for use with bands having locking lugs only formed thereon. In such case the slot may be made substantially equal to the cross-section of the lug which is to be received therein.

These as well as other changes are all contemplated by me. For this reason it is my desire that the claims which are hereunto appended for the purpose of defining my invention should be limited only by the prior art.

*Definitions.*—The term "advancing wall of the slot" used in the specification and claims is used to denote the wall of the slot which is nearest the direction in which the nut is being moved. For example: If the nut 10 in Figure 3 is being advanced in such a direction as to cause the nut to move off the bolt, then the wall 40 is the advancing wall. Similarly, under similar conditions, the wall 41 of the nut 27, or the wall 64 of the nut 58 is the advancing wall.

The term "receding wall" as used in the specification and claims is used to denote that wall of the slot which is furthest in the direction of the motion of the nut. For example: Were the nut 10 in Figure 3 to be rotated in a direction so as to move the nut off the bolt, the wall 39 of the slot 11 would be the receding wall. Under similar conditions, the wall 42 of the nut 27, or the wall 65 of the nut 58 would be the receding wall.

Having described my invention what I claim as new and useful is:—

1. In combination a male and female element threadably joined together, the said female element having an annular groove formed therein on the inner face thereof and a slot extending outwardly from the said groove and a split annular locking band composed of substantially a single turn mounted upon the said male element and so positioned within the said groove formed in the said female element that the inner face of the said band grips the threads upon the said male element and the outer face of the said band is entirely free of the walls of the said groove, the said band terminating in a locking lug positioned within the said slot.

2. In combination a bolt, a nut mounted upon the said bolt, the said nut having an annular groove formed therein on the lower face thereof and a slot leading outwardly from the said groove, and a helical band composed of substantially a single turn mounted upon the said bolt and positioned within the said groove, the said band having an internal diameter substantially equal to that of the said nut threads, having an external diameter less than that of the said groove and terminating in a locking lug positioned within the said slot.

3. In combination a bolt, a nut mounted upon the said bolt, the said nut having an annular groove formed therein on the lower face thereof and a slot leading outwardly from the said groove, and an internally threaded split annular locking band composed substantially of a single turn mounted upon the said groove, the threads of the internally threaded band having a pitch and diameter substantially equal to the pitch and diameter of the threads formed on the said bolt, the external diameter of the said band being smaller than that of the said groove, and the said band terminating in a lug positioned within the said slot.

In witness whereof I hereby affix my signature.

ALBERT HALL.